United States Patent [19]

Yoshida et al.

[11] Patent Number: 5,186,491
[45] Date of Patent: Feb. 16, 1993

[54] AUTO IGNITION DEVICE

[75] Inventors: Nobuo Yoshida, Himeji; Kenziro Nishida, Ageo; Noboru Inoue, Himeji, all of Japan

[73] Assignee: Nippon Kayaku Kabushiki Kaisha, Tokyo, Japan

[21] Appl. No.: 721,278

[22] Filed: Jun. 26, 1991

[30] Foreign Application Priority Data

Jun. 29, 1990 [JP] Japan .................. 2-169765

[51] Int. Cl.[5] ............................................ B60R 21/26
[52] U.S. Cl. ................................. 280/741; 422/165
[58] Field of Search ............... 280/736, 740, 741, 728, 280/730, 731, 732, 742, 743, 734; 102/531, 530; 60/256; 422/164, 165, 166

[56] References Cited

U.S. PATENT DOCUMENTS

| | | | |
|---|---|---|---|
| 2,064,503 | 12/1936 | Temple, Jr. ................. | 102/531 |
| 2,449,695 | 9/1948 | Galloway ..................... | 422/166 |
| 4,084,512 | 4/1978 | San Miguel ................. | 102/531 |
| 4,547,342 | 10/1985 | Adams et al. ............... | 102/531 |
| 4,561,675 | 12/1985 | Adams et al. ............... | 280/734 |
| 4,578,247 | 3/1986 | Bolieau ....................... | 102/531 |
| 4,858,951 | 8/1989 | Lenzen ........................ | 280/741 |
| 4,944,528 | 7/1990 | Nilsson et al. ............. | 280/741 |

FOREIGN PATENT DOCUMENTS 2022194 12/1979 United Kingdom ............... 280/742

Primary Examiner—Karin L. Tyson
Attorney, Agent, or Firm—Nields & Lemack

[57] ABSTRACT

A gas generation device for a vehicular passenger protecting system. The gas generation device is equipped with an auto ignition device that is ignitable at a predetermined temperature when the gas generator is heated from an external source. Thus a primary ignition agent having an ignition temperature lower than the ignition temperature of a secondary ignition agent ignites first, causing a pressure rise which in turn moves a sealing member. In one embodiment, the sealing member breaks a gas-tight container which causes the ignition of the secondary igniton agent, which in turn causes ignition of a gas generating agent. In a second embodiment, the sealing member causes ignition of the gas generating agent directly. In either case, the primary ignition agent ignites prior to sufficient loss in mechanical strength of the gas generation casing body housing the gas-tight container.

6 Claims, 2 Drawing Sheets

AUTO IGNITION DEVICE

BACKGROUND OF THE INVENTION

In the prior art, there is known a vehicular passenger protecting device for expanding an air bag with gases generated by a gas generator so as to ensure the safety of the passenger in the event of a vehicular collision. This gas generator is housed, for example, in a gas generator casing together with an ignition device in which a gas generation agent has an ignition agent. To satisfy light weight specifications, the gas generator casing is usually made of a light metal or material such as an aluminum alloy. This material has its mechanical strength lowered when overheated to a high temperature. Therefore, the gas generator made of such material will not encounter problems in the ordinary case, in which the ignition agent is ignited at the collision by the ignition device and in which the gas generation agent is then ignited to generate the gases. In case, however, the vehicle is extraordinarily overheated from the outside as by fire or during disposal the ignition agent or the gas generation agent is ignited after the gas generator casing has lost its mechanical strength, if its ignition temperature is higher than the temperature at which the mechanical strength of the gas generator casing drops. Then, this gas generator casing may be broken and its pieces scattered by the pressure built up in the gas generator.

One solution to this problem is disclosed in U.S. Pat. No. 4,561,675, for example. The disclosure is directed to an auto ignition device which is constructed such that there is confined in a container (i.e., a metal casing) made of a metal foil and acting as an independent member a primary ignition agent capable of spontaneous ignition at a temperature of about 177° C., low enough for retaining the mechanical strength of the container, such that this container is fixed within the gas generator casing by means of a refractory adhesive or cushion, and such that the primary ignition agent is directed toward a secondary ignition agent or a gas generation agent ignitable at about 343° C.

However, the gas generator casing and the container of the '675 patent are independent from each other and are mechanically fixed by means of the refractory adhesive or cushion. When the gas generator is heated from the outside by a flame or the like, the heat is transferred through the gas generation agent casing, the refractory adhesive or cushion and the container to the primary ignition agent. Thus, the structure is defective in terms of poor thermal conductivity. If, moreover, a clearance should be established between the gas generator casing and the container, the thermal conduction is deteriorated even more, to lengthen the time period for igniting the primary ignition agent. As a result, the primary ignition agent is ignited, after the temperature for lowering the mechanical strength of the gas generator casing has been reached, so that the gas generator casing might be broken by internal pressure causing scattering of its pieces.

Normally, smokeless powder is used for the automatic ignition agent, but smokeless powder generates decomposition gas when maintained at elevated temperatures for a long period. For example, according to U.S. Pat. No. 4,561,675, where an independent container member comprising a metal foil contains the automatic ignition agent, the decomposition gas can build up sufficient inner pressure to destroy the container itself.

In U.S. Pat. No. 4,944,528 on the other hand, there is disclosed technology concerning an auto ignition device. This auto ignition device is constructed such that a primary ignition agent casing confining a primary ignition agent ignitable at a surrounding temperature of about 160° C. to 180° C. is fitted through an insulator in the opening of a gas generation agent casing.

The primary ignition agent casing is fitted in the gas generator casing through a molded member and a plate-shaped insulator. These members have their boundary gas-tightness lowered in the temperature cycle in the natural circumstances due to the difference in the thermal expansions of the individual members. This causes the secondary ignition agent to absorb the moisture, thus inviting a defect that the gas generator may be inoperative, even if necessary.

It is, therefore, an object of the present invention to provide an auto ignition device in a gas generator for a vehicular passenger protecting device, which is able to enhance the heat sensitivity to heat from the outside and to ignite the ignition agent or the gas ignition agent safely and reliably while preventing moisture absorptivity.

SUMMARY OF THE INVENTION

The problems of the prior art have been overcome by the present invention, which relates to a gas generation device for a vehicular passenger protecting system, which is equipped with an auto ignition device made ignitable at a predetermined temperature when a gas generator is heated from the outside by a flame or the like. More particularly, the present invention relates to an auto ignition device for the gas generator, in which the heat sensitivity to heat from the outside and the reliability of ignition from a primary ignition agent to a secondary ignition agent or a gas generation agent are enhanced.

BRIEF DESCRIPTION OF THE DRAWINGS

The present invention will be described more specifically in the following in connection with the embodiments thereof with reference to the accompanying drawings, in which.

Figure 1:
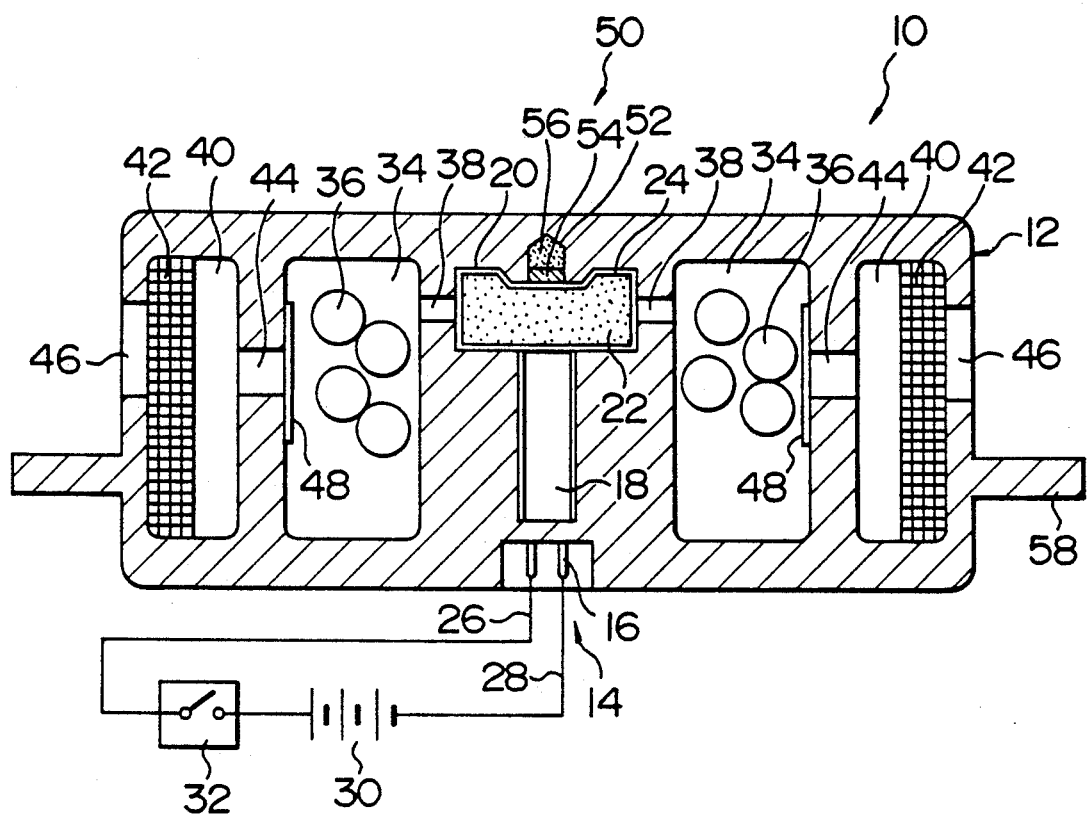
FIG. 1 is a section showing a gas generator according to a first embodiment of the present invention.

In the Drawings:
10 . . . Gas Generator;
12 . . . Gas Generator Casing Body;
14 . . . Ignition Device;
16 . . . Plug Socket;
18 . . . Igniter;
20 . . . Ignition Chamber;
22 . . . Secondary Ignition Agent;
24 . . . Gas-Tight Container;
34 . . . Gas Generation Chamber;
36 . . . Gas Generation Agent;
38 . . . Ignition Hole;
40 . . . Filter Chamber;
42 . . . Filter;

44 . . . Gas Passage;
46 . . . Gas Relief Holes;
48 . . . Sealing Plate;
50 and 50' . . . Auto Ignition Device;
52, 52a, 52b and 52' . . . Recesses;
54 and 54' . . . Sealing Members; and
56 . . . Primary Ignition Agent.

DETAILED DESCRIPTION OF THE INVENTION

In order to achieve the above-specified object and other objects, there is provided, in a gas generation device for a vehicular passenger protecting system in which an ignition unit having a gas-tight container containing a secondary ignition agent such as a mixture of boron and potassium nitride and a gas generation agent for generating gases when ignited are housed within a gas generator casing body, an auto ignition device characterized in that said gas generator casing body is formed with a chamber having a recess and a sealing member for closing the opening of said recess; and in that a primary ignition agent such as smokeless powder made ignitable at a lower temperature than said secondary ignition agent is confined in said chamber.

In a preferred embodiment of the present invention, the chamber defined by said recess and said sealing member is positioned to face said gas-tight container containing said secondary ignition agent, so that said sealing member is thrusted toward said secondary ignition agent by the pressure rise in said chamber according to the ignition of said primary ignition agent partially to break said gas-tight container, thereby to ignite said secondary ignition agent.

In an alternative embodiment, the chamber defined by said recess and said sealing member is positioned to face said gas generation agent so that said sealing member may be moved toward said gas generation agent by the pressure rise in said chamber according to the ignition of said primary ignition agent, to ignite said gas generation agent.

According to the present invention, the chamber to be defined by the recess in the gas generator casing body and the sealing member confines the primary ignition agent which is ignitable at a lower temperature than that of the secondary ignition agent. When the gas generator casing body is heated from the outside, the heat is transferred directly to the primary ignition agent so that the sensitivity to the temperature rise of the outside can be improved to enhance the heat sensitivity. In case, therefore, a material having its mechanical strength lowered at a higher temperature is used in the gas generator casing, the secondary ignition agent or the gas generation agent can be safely and reliably ignited by igniting the primary ignition agent at a temperature lower than that which lowers the mechanical strength. Since, moreover, the ignition agent is sealed by the sealing member of the gas-tightness holding member, no moisture is allowed to pass through the gas generator casing body, so that the gas generator can be prevented from becoming inoperative when operation is necessary.

If the chamber to be defined between the recess and the sealing member is positioned toward the gas-tight container containing the secondary ignition agent, the pressure in the recess is raised by the ignition of the primary ignition agent due to heating from the outside, so that the sealing member is thrusted toward the gas-tight container to break a portion of the container, thereby to ignite the secondary ignition agent with ease. As a result, the ignition from the primary ignition agent to the secondary ignition agent is remarkably reliable.

If, on the other hand, the chamber to be defined between the recess and the sealing member is positioned toward the gas generation agent, the sealing member can be thrusted toward the gas generation agent by the pressure rise in the chamber accompanying the ignition of the primary ignition agent to ignite the gas generation agent directly.

Incidentally, in an ordinary operation such as a collision of a vehicle, the gas generation agent is ignited to generate gases by the ignition of the secondary ignition agent due to the ignition device. By the calories generated in this ordinary operation, moreover, the temperature of the gas generator casing body is raised to ignite and burn out the primary ignition agent. As a result, no agent is left, which enhances safety.

In the Figures, a gas generator 10 for a vehicular passenger protecting device according to an embodiment of the present invention is equipped with a gas generator casing body 12 for generating gases in its interior. This gas generator casing body 12 has a generally cylindrical contour and is made of a light material such as an aluminum alloy, which has lower mechanical strength at high temperatures. At the central portion of this gas generator casing body 12, there are disposed a plug socket 16 and an igniter 18, which constitute together an ignition device 14. This igniter 18 is formed at a portion corresponding to its leading end with a cylindrical ignition chamber 20, in which is housed a gas-tight container 24 containing a secondary ignition agent 22. This gas-tight container 24 is made of an aluminum foil having a thickness of about 50 μm, for example, to retain the gas-tightness of the secondary ignition agent 22, thereby to protect it from moisture. The plug socket 16 is connected through leads 26 and 28 to a battery 30 and an impact sensor 32 for sensing a collision of the vehicle. When this impact sensor 32 operates, the igniter 18 is supplied from the battery 30 with an electric current necessary for the ignition.

The aforementioned gas generator casing body 12 is formed around the ignition chamber 20 and the igniter 18 with an annular gas generation chamber 34, in which is housed a granular gas generation agent 36 made of sodium azide and potassium nitrate, for example. Moreover, an ignition hole 38 provides communications between the ignition chamber 20 and the gas generation chamber 34. On the other hand, the aforementioned gas generator casing body 12 is formed around the gas generation chamber 34 with an annular filter chamber 40 which has a filter housed therein. Moreover, a gas passage 44 provides the communications between the gas generation chamber 34 and the filter chamber 40, and a gas relief hole 46 provides the communications between the filter chamber 40 and the outside. The portion of the filter chamber 40 inside of the gas passage hole 44 is sealed with a sealing plate 48 for blocking the inflow of moisture. The gas generator casing body 12 has formed therearound a number of gas relief holes 46, from which the gases ar relieved and fed to an air bag (not-shown).

Figure 2:
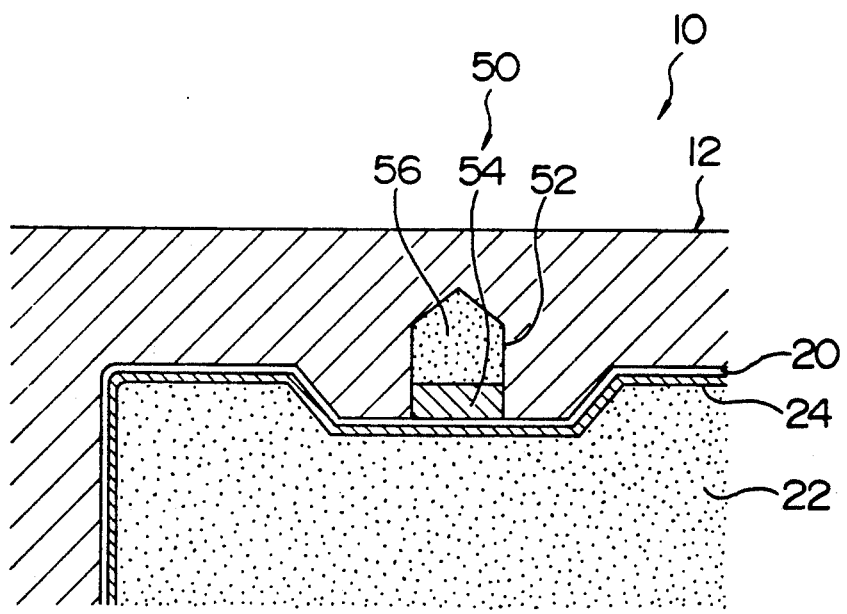
FIG. 2 is an enlarged section showing the portion of the auto ignition device of FIG. 1.
Figure 3A:
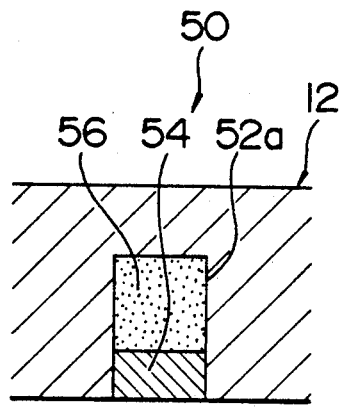
FIGS. 3(a) and 3(b) are sections showing modifications of the recessed portion of the embodiment of the present invention.
Figure 3B:
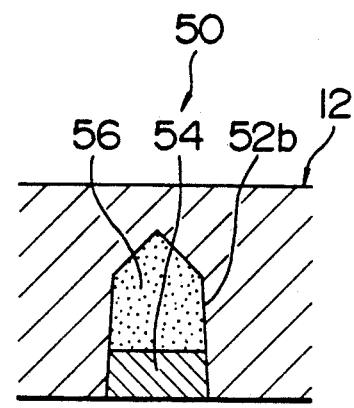

A portion of the gas generator casing body 12 facing the aforementioned gas-tight container 24 is equipped with an auto ignition device 50 (best seen in FIG. 2). More specifically, the portion of the gas generator casing body 12 opposite igniter 18 is slightly thickened and formed with a recess 52, which is shaped to add a conical portion to the column-shaped drum. This recess 52 and a sealing member 54 fitted in the opening of the recess 52 form together a chamber housing a primary ignition agent 56. This primary ignition agent 56 to be used is exemplified by smokeless powder which will ignite at a lower temperature than the temperature which lowers the mechanical strength of the gas generator casing body 12. The recess 52 is given a practical depth of about 2 to 10 mm or preferably about 5 to 6 mm, because it is restricted by the thickness of the gas generator casing body 12. The diameter of the recess 52 can be freely set; but if excessively large, it is difficult to fix the sealing member 54 at a right angle with respect to the axis of the recess 52, and if excessively small, it reduces the amount of the primary ignition agent 56. Thus, the practical diameter is 2 to 8 mm, or preferably 4 to 5 mm. As to the shape, on the other hand, the recess 52 is formed into a column-shaped recess 52a, as shown in FIG. 3(a), or into a recess 52b, which is shaped by adding a conical portion to a column-shaped drum tapered toward the opening, as shown in FIG. 3(b).

With sealing member 54, the fit with recess 52 should be a forced seal, which is attained by first inserting the sealing member 54 and then caulking the outside upper circular periphery of recess 52, by which the strength required to release sealing member 54 (bullet-releasing drag force) can also be adjusted.

The bullet-releasing drag force largely influences the moving speed of the sealing plug (bullet). For example, when the bullet-releasing drag force is zero, the moving speed of the sealing plug becomes very slow and cannot penetrate the container enclosing the secondary ignition agent.

For feasible insertion and fitting of the sealing member 54, the most preferable thickness of the sealing member 54 is about one third as large as the thickness of the recess 52. On the other hand, the material of the sealing member 54 can be freely selected from a corrosion resistant metal such as stainless steel, a resin such as polycarbonate, and a light metal such as an aluminum, and for practical purposes is aluminum or stainless steel.

Here, reference numeral 58 designates a flange which is formed around the other periphery of the gas generator casing body 12 so that the gas generator 10 is mounted at the flange 58 on a predetermined portion of the vehicle (not shown).

With the gas generator 10 thus constructed, the impact sensor 32 operates in the ordinary operation, i.e., at a collision of the vehicle so that the electric current is supplied from the battery 30 through the leads 26 and 28 and the plug socket 16 to the igniter 18. Then, this igniter 18 ignites the secondary ignition agent 22 by breaking a portion of the gas-tight container 24 in the ignition chamber 20. The flame of this secondary ignition agent 22 breaks another portion of the gas-tight container 24 to ignite the gas generation agent 36 in the gas generation chamber 34. Then, the gases generated by the combustion of the gas generation agent 36 break the sealing plate 48 and enter the filter chamber 40 from the gas generation chamber 34 through the gas passage 44. These gases have their residuals filtered out by the filter 42 until they are relieved from the gas relief holes 46 to the outside of the gas generator 10. The gases thus relieved expand the air bag (not shown) to protect the vehicular passenger against danger resulting from the collision.

Next, in case the casing body 12 of the gas generator 10 is extraordinarily heated from the outside, as is experienced when the disposed automobile is to be burned out, the primary ignition agent 56 of the auto ignition device 50 is ignited at a temperature lower than the level which might otherwise deteriorate the mechanical strength of the gas generator casing body 12. Then, the pressure in the recess 52 is raised to force the sealing member 54 toward the gas-tight container 24 in the ignition chamber 20 so that the gas-tight container 24 is partially broken to ignite the secondary ignition agent 22. In the subsequent operations like those of the ordinary case, the gas generation agent 36 is ignited to generate the gases until the gases having their residuals filtered out are relieved from the gas relief holes 46 to the outside of the gas generator 10. Since, in this case, the primary ignition agent 56 is confined in the chamber which is defined between the recess 52 of the gas generator casing body 12 and the sealing member 54, the heat applied from the outside is transferred from the gas generator casing body 12 directly to the primary ignition agent 56 so that the thermal sensitivity to the temperature rise is enhanced. Since, moreover, the gas generator casing body 12 has no opening for passing moisture, no moisture is admitted, thereby eliminating such inoperativeness of the gas generator as might otherwise be caused by the secondary ignition agent 22 having absorbed moisture. On the other hand, the combustion gases of the primary ignition agent 56 may only depress the gas-tight container 24 but not break it. In the present embodiment, on the contrary, the sealing member 54 is moved with a high speed by the combustion gases of the primary ignition agent 56 so that its edge never fails to break a portion of the gas-tight container 24. As a result, the secondary ignition agent 22 thus exposed is ignited without any difficulty to remarkably enhance the reliability of the ignition from the primary ignition agent 56 to the secondary ignition agent 22.

In the ordinary operations, as exemplified by the collision of the automobile, on the other hand, the igniter 18, the secondary ignition agent 22 and the gas generation agent 36 are sequentially ignited, as described hereinbefore. Then, the temperature of the gas generator casing body 12 is gradually raised by the calories generated in those series of operations. When the rising temperature reaches the ignition level of the primary ignition agent 56, only the primary ignition agent 56 ignites and disappears so that no chemical agent remains, thereby providing safety.

According to the present invention, the primary ignition agent is contained in recess 52 which is a part of the housing, and because sealing member 54 has a thickness of about one third ($\frac{1}{3}$) the depth of recess 52, it has sufficient strength to overcome destruction.

Furthermore, when the automatic ignition agent burns rapidly, the system is such that the sealing member is forced to move at high speed with the present invention, and thus, the quantity of the automatic ignition agent can be very small, which is another feature of the invention. With the metal foil such as described in the U.S. Pat. No. 4,561,675 specification, the sealed plug will not move at high speed and hence will not have sufficient effect to penetrate the container enclosing the secondary ignition agent.

Two gas generators 10 were prepared in the gas generator casing body 12 having the aforementioned structure, by charging the recess 52 having a diameter of 5 mm and a depth of 6 mm with 50 mg of smokeless powder having a four-second ignition temperature of 175° C. according to the krupp test as the primary ignition agent 56, by fitting the sealing member 54 of aluminum alloy having a diameter of 5 mm and a thickness of 2 mm, and by housing the secondary ignition agent 22 in the gas-tight container 24 of aluminum foil, having a thickness of 50 μm. One of the gas generators 10 was heated with a flame from its peripheral outside to reveal that the gas generator casing body 12 operated without any breakage. The other gas generator 10 was ignited and operated in the ordinary method by the igniter 18. After this, the gas generator 10 was cooled down and disassembled to reveal that the sealing member 54 was separated from the recess 52 and that the primary ignition agent 56 was ignited to disappear in the ordinary operations, too.

On the other hand, the gas generator having none of the auto ignition devices according to the embodiment of the present invention was likewise heated from the outside. Then, the gas generator casing body was broken. These experiments have confirmed the effects of the auto ignition device according to the present invention.

Figure 4:
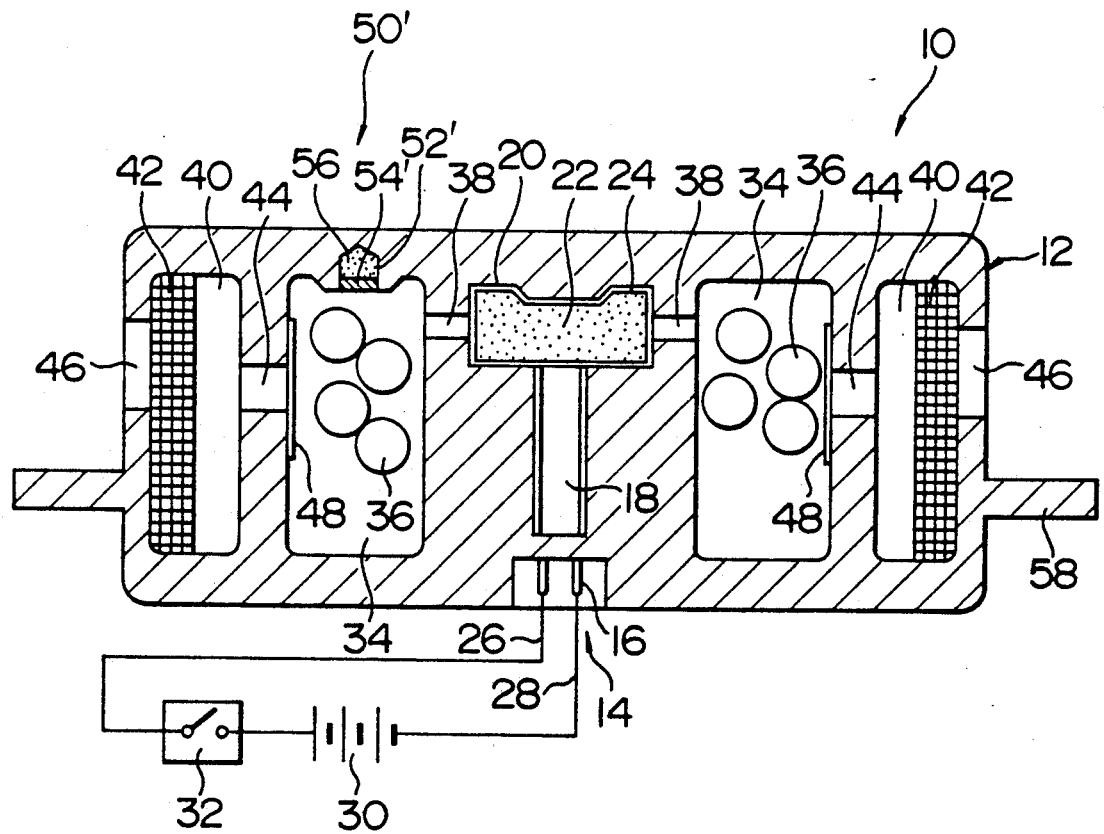
FIG. 4 is a section showing the gas generator according to the second embodiment of the present invention.

Turning now to FIG. 4, the gas generator of this embodiment is constructed such that an auto ignition device 60' like that of the foregoing first embodiment is disposed in the gas generator casing body 12 and positioned to face the gas generation agent 36. Specifically, the gas generator casing body 12 is formed with a similar recess 52' at its slightly thickened portion corresponding to the gas generation chamber 34, and the primary ignition agent 56 is confined in a chamber which is defined by that recess 52' and a sealing member 54' fitted in the opening of the recess 52'. The remaining structure is similar to that of the first embodiment.

In the gas generator thus constructed, the sealing member 54' could be moved toward the gas generation agent by the pressure in the chamber, which was raised as a result of the ignition of the primary ignition agent 56, to ignite the gas generation agent 36 directly and to provide effects like those of the aforementioned first embodiment.

Here, in the individual embodiments thus far described, the primary ignition agent 56 may be selected from such chemical agents as will ignite spontaneously at a temperature low enough to avoid deterioration of the mechanical strength of at least the gas generator casing body 12. The material of the gas generator casing body 12 may be a light metal including an aluminum alloy or a light material. The shape of the gas generator casing body 12 and the arrangement and size of the ignition chamber 20 and the gas generation chamber 34 can be arbitrary and should not be limited to those of the embodiments.

On the other hand, the recesses 52 and 52' of the auto ignition devices 50 and 50' are individually positioned to face either the gas-tight container 24 containing the secondary ignition agent 22 or the gas generation agent 36, but may be positioned to face both of them. Alternatively, the recesses 52 and 52' may be formed in any position, if they can ignite the secondary ignition agent 22 or the gas generation agent 36 without any difficulty, and may be formed into arbitrary shapes.

As has been described hereinbefore, according to the present invention, the primary ignition agent is disposed in the chamber which is defined between the recess formed in the gas generator casing body and the sealing member. As a result, the thermal sensitivity can be enhanced in case the gas generator is heated from the outside. Another effect is that the moisture absorptivity can be prevented, which allows safe and reliable ignition of the primary ignition agent, and in turn, the secondary ignition agent or the gas generation agent.

We claim:

1. A gas generation device for a vehicle passenger protecting system comprising:
   a gas generation casing body comprising:
   an ignition unit comprising a first chamber in said gas generation casing body, said first chamber having a gas-tight container containing secondary ignition means;
   gas generation means for generating gases when ignited;
   and auto ignition means disposed in said gas generation casing body, said auto ignition means comprising:
   a second chamber in said gas generation casing body separate from said first chamber, said second chamber being defined by a recess in said casing body, said recess having an opening therein, and sealing means for closing said opening; and
   primary ignition means in said second chamber, said primary ignition means being ignitable at a temperature lower than the ignition temperature of said secondary ignition means.

2. The gas generation device of claim 1, wherein said second chamber is positioned with respect to said gas-tight container such that the pressure rise in said second chamber which occurs upon the ignition of said primary ignition means causes said sealing means to thrust toward said secondary ignition means and break said gas-tight container, thereby igniting said secondary ignition means.

3. The gas generation device of claim 2, wherein said second chamber faces said gas-tight container.

4. The gas generation device of claim 1, wherein said second chamber is positioned with respect to said gas generation means such that the pressure rise in said second chamber which occurs upon the ignition of said primary ignition means causes said sealing means to move toward said gas generation means and ignite said gas generation means.

5. The gas generation device of claim 4, wherein said second chamber faces said gas generation means.

6. A method of preventing, in a gas generation device for a vehicular passenger protection system, sufficient loss in mechanical strength of a gas generator casing for causing breakage of said casing prior to the ignition of primary ignition means in said system, said method comprising:
   a. providing in said gas generation device a gas generation casing body housing a gas-tight container containing secondary ignition means, and housing gas generation means for generating gases when ignited;
   b. providing a chamber in said gas generation casing body, said chamber being separate from said gas-tight container and comprising a recess in said casing body, said recess having an opening and sealing means for closing said opening;
   c. providing primary ignition means in said chamber, said primary ignition means having a temperature of ignition lower than the temperature of ignition of said secondary ignition means; and
   d. causing a pressure rise in said chamber by igniting said primary ignition means with an external heat source, said pressure forcing said sealing means towards said gas generating means so as to ignite said gas generating means prior to said gas generating casing body losing sufficient mechanical strength to cause breakage thereof.

* * * * *